(12) United States Patent
Harada

(10) Patent No.: US 11,473,841 B2
(45) Date of Patent: Oct. 18, 2022

(54) ELECTRIC FURNACE

(71) Applicant: NIPPON STEEL CORPORATION, Tokyo (JP)

(72) Inventor: Toshiya Harada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 537 days.

(21) Appl. No.: 16/465,501

(22) PCT Filed: Nov. 10, 2017

(86) PCT No.: PCT/JP2017/040569
§ 371 (c)(1),
(2) Date: May 30, 2019

(87) PCT Pub. No.: WO2018/110171
PCT Pub. Date: Jun. 21, 2018

(65) Prior Publication Data
US 2020/0064071 A1    Feb. 27, 2020

(30) Foreign Application Priority Data

Dec. 16, 2016 (JP) .............................. JP2016-244502

(51) Int. Cl.
*F27D 1/00* (2006.01)
*F27D 3/00* (2006.01)
(Continued)

(52) U.S. Cl.
CPC .......... *F27D 1/0043* (2013.01); *C21C 5/5211* (2013.01); *C22B 7/04* (2013.01);
(Continued)

(58) Field of Classification Search
CPC ......... C21C 5/5211; C21C 5/527; C22B 7/04; F27B 3/08; F27B 3/183; F27D 1/0043;
(Continued)

(56) References Cited

U.S. PATENT DOCUMENTS 3,900,696 A * 8/1975 Tress ...................... F27D 3/18
373/80
4,146,158 A * 3/1979 Gerbig ................ B22D 39/006
164/156.1
(Continued)

FOREIGN PATENT DOCUMENTS

CA       2 525 926 A1    11/2004
CN       102016081 A      4/2011
(Continued)

OTHER PUBLICATIONS

Korean Office Action for counterpart Korean Application No. 10-2019-7015892, dated Feb. 12, 2020, with English translation.
(Continued)

*Primary Examiner* — Jessee R Roe
*Assistant Examiner* — Michael Aboagye
(74) *Attorney, Agent, or Firm* — Birch, Stewart, Kolasch & Birch, LLP

(57) ABSTRACT

The present invention provides an electric furnace including: a cylindrical furnace wall; a furnace cover that is provided at an upper end of the furnace wall; and a furnace bottom that is provided at a lower end of the furnace wall and includes a deep bottom portion and a shallow bottom portion as a region having a height of 150 mm to 500 mm from a deepest point of the deep bottom portion, in which a slag pouring port into which molten slag or a solidified slag lump is capable of being poured from a slag transport container directly or through a tilting trough is provided, the slag pouring port overlaps the shallow bottom portion in a plan view, and the area ratio of the shallow bottom portion to the furnace bottom in a plan view is 5% to 40%.

6 Claims, 10 Drawing Sheets

(51) Int. Cl.
*F27D 3/14* (2006.01)
*F27D 1/18* (2006.01)
*F27D 7/02* (2006.01)
*F27D 3/15* (2006.01)
*H05B 7/20* (2006.01)
*C21C 5/52* (2006.01)
*C22B 7/04* (2006.01)

(52) U.S. Cl.
CPC ......... *F27D 1/1858* (2013.01); *F27D 3/0026* (2013.01); *F27D 3/0031* (2013.01); *F27D 3/14* (2013.01); *F27D 3/1518* (2013.01); *F27D 7/02* (2013.01); *H05B 7/20* (2013.01); *F27D 2003/0075* (2013.01); *F27M 2001/023* (2013.01)

(58) Field of Classification Search
CPC ........... F27D 1/1858; F27D 2003/0075; F27D 3/0026; F27D 3/0031; F27D 3/14; F27D 3/1518; F27D 7/02; H05B 7/20
USPC .......... 373/72, 42, 81, 83, 84; 266/201, 232, 266/45, 900
See application file for complete search history.

(56) References Cited

U.S. PATENT DOCUMENTS

| | | | |
|---|---|---|---|
| 4,455,660 A | 6/1984 | Bühler | |
| 5,462,259 A * | 10/1995 | Guido | C21C 5/5229 266/45 |
| 5,715,272 A | 2/1998 | Kaell et al. | |
| 6,473,446 B2 * | 10/2002 | Stercho | F27B 3/085 373/72 |
| 9,217,185 B2 * | 12/2015 | Harada | C04B 5/06 |
| 2003/0140732 A1 | 7/2003 | Edlinger | |
| 2015/0135896 A1 | 5/2015 | Harada et al. | |

FOREIGN PATENT DOCUMENTS

| | | | | |
|---|---|---|---|---|
| CN | 103930574 A | | 7/2014 | |
| FR | 1.598.035 A | | 8/1970 | |
| GB | 1193527 | * | 6/1970 | ............... F27D 3/14 |
| JP | 52-33897 A | | 3/1977 | |
| JP | 58-55675 A | | 4/1983 | |
| JP | 62-153140 A | | 7/1987 | |
| JP | 10-2538 A | | 1/1998 | |
| JP | 10-175046 A | | 6/1998 | |
| JP | 2002-317918 A | | 10/2002 | |
| JP | 2003-520899 A | | 7/2003 | |
| JP | 2006-528732 A | | 12/2006 | |
| JP | 2008-75950 A | | 4/2008 | |
| JP | 5522320 B1 | | 6/2014 | |
| KR | 10-2014-0079805 A | | 6/2014 | |
| WO | WO 2014/003123 A1 | | 1/2014 | |

OTHER PUBLICATIONS

Extended European Search Report for corresponding European Application No. 17881127.9, dated Apr. 6, 2020.
Chinese Office Action and Search Report for counterpart Chinese Application No. 201780076913.3, dated Nov. 19, 2019, with partial English translation.
International Search Report for PCT/JP2017/040569 dated Jan. 30, 2018.
Written Opinion of the International Searching Authority for PCT/JP2017/040569 (PCT/ISA/237) dated Jan. 30, 2018.

* cited by examiner

ELECTRIC FURNACE

TECHNICAL FIELD OF THE INVENTION

The present invention relates to an electric furnace that is used for a process in which molten slag or a solidified slag lump produced in a steelmaking step is poured from a slag transport container into an electric furnace directly or through a tilting trough and is reduced.

Priority is claimed on Japanese Patent Application No. 2016-244502, filed on Dec. 16, 2016, the content of which is incorporated herein by reference.

RELATED ART

Recently, the recycling of resources has been demanded, and it is required that valuable materials such as Fe or P are separated and collected from slag (steelmaking slag) which is produced using a converter or the like through desulfurization, dephosphorization, or decarburization refinement in a steelmaking step and that the steelmaking slag is reformed into high-quality slag to be reused.

For example, Patent Document 1 discloses a slag treatment method including: a first step of obtaining modified slag by adding iron and steel slag to molten iron and steel in a melting furnace, adding heat and a reducing material to modify the iron and steel slag, and causing Fe, Mn, and P in the slag to move to molten iron and steel; and second and third steps of sequentially oxidizing Mn and P in the molten iron and steel to move to modified slag and sequentially extracting high-Mn slag and high-P slag.

Patent Document 2 discloses a method including: pouring iron and steel slag containing higher than 5 wt % of iron oxide into a steel bath containing lower than 1.5 wt % of carbon; obtaining the steel bath containing higher than 2.0 wt % of carbon by introducing carbon or a carbon carrier into the steel bath to carburize the steel bath; and reducing oxides in the iron and steel slag.

In this method, during the pouring of the slag, the slag reacts vigorously with the steel bath such that the foaming of the slag (slag foaming) or the overflowing of the slag from the furnace may occur. In order to suppress slag foaming and overflowing, the carbon content in the steel bath is reduced before the pouring of the slag. As a result, the reaction rate during the pouring of the slag is alleviated, and subsequently the carbon content in the steel bath is increased to perform a reduction treatment of the slag.

Patent Document 3 describes a process of continuously charging molten slag from a transport ladle into a reaction container including a molten iron layer and a slag layer to perform a reduction treatment.

Patent Document 4 describes that high-temperature molten slag having fluidity is temporarily held in a slag holding furnace, a molten slag layer is formed as a buffer zone on a molten iron layer in an electric furnace, molten slag is poured from the slag holding furnace into the molten slag layer, and carbon as a reducing material is supplied to a slag-metal interface.

In the structure described in Patent Document 4, the electric furnace is used. Therefore, a reduction reaction between iron (FeO) and carbon (C) in the slag is more predominant than a reduction reaction between the slag and the molten iron.

Accordingly, Patent Document 4 is advantageous in that, even in a case where the C concentration in the molten iron is low at about 1.5 mass %, the slag can be reduced without carburization, and the working efficiency can be improved.

Further, in the structure described in Patent Document 4, instead of directly pouring molten slag into the electric furnace, molten slag is temporarily held in the slag holding furnace which is disposed adjacent to the electric furnace, the molten slag layer is formed as a buffer zone on the molten iron layer in the electric furnace, and the molten slag is slowly poured while adjusting the pouring amount. Therefore, the structure described in Patent Document 4 is advantageous in that an atmosphere can be easily controlled by closing the inside of the furnace and slag foaming can be reduced during the pouring of the slag.

PRIOR ART DOCUMENT

Patent Document

Patent Document 1 Japanese Unexamined Patent Application, First Publication No. S52-033897

Patent Document 2 Published Japanese Translation No. 2003-520899 of the PCT International Publication Patent Document 3 Published Japanese Translation No. 2006-528732 of the PCT International Publication Patent Document 4 Japanese Patent No. 5522320

DISCLOSURE OF THE INVENTION

Problems to be Solved by the Invention

In the slag treatment method described in Patent Document 1, since the reduction treatment is performed using a converter, the molten iron and steel and the slag are strongly stirred.

Therefore, in a case where the carbon concentration in the molten iron and steel during the pouring of the slag is high, the slag comes into contact with the molten iron and steel such that the reaction is promoted and foaming occurs.

In order to avoid foaming, the slag is poured into the molten iron and steel having a low carbon concentration, and then in order to promote the reduction reaction, carbon is added into the steel bath to increase the carbon concentration in the molten iron and steel. Therefore, it is necessary to perform the slag reduction treatment multiple times and to repeat the treatment of oxidizing and extracting Mn and P, and thus the working efficiency and the productivity may deteriorate.

In the slag reduction method described in Patent Document 2, the reduction treatment is also performed using a converter. Therefore, in order to increase or decrease the carbon concentration in molten iron and to reduce the iron and steel slag, it is necessary that treatments such as decarburization heating and carburization reduction are repeated such that the working efficiency and the productivity decrease.

In the slag reduction method described in Patent Document 3, an upper end of the reaction container is opened. Therefore, an atmosphere in the reaction container cannot be controlled, which may inhibit the slag reduction reaction.

In the slag reduction method described in Patent Document 4, the holding furnace is used. Therefore, not only the electric furnace but also the holding furnace are required as a slag reduction treatment device, and there is a problem in that the scale of the device is large.

In addition, in a case where the holding furnace is used, the contact area between the molten slag and a holding container surface increases, and thus there is a problem in that heat radiation loss increases.

Further, a part of the molten slag may be solidified to move to solidified slag while being conveyed or being poured into the electric furnace.

It is desirable that the solidified slag is also reduced from the viewpoint of recycling.

However, in the slag reduction method described in Patent Document 4, the holding furnace is used. Therefore, there is a problem in that solidified slag cannot be charged.

In addition, even in a case where solidified slag is charged into the electric furnace, depending on the size and the weight thereof, the solidified slag passes through the molten slag layer and comes into contact with the molten iron layer such that slag foaming may occur, and there is a problem in that the molten slag layer is not likely to function as a buffer zone.

The present invention has been made in consideration of the above-described problems and an object thereof is to provide an electric furnace in which the reduction treatment efficiency can be improved by maintaining an internal atmosphere of the electric furnace to be constant and preventing the occurrence of large slag foaming caused when just-poured molten slag or a solidified slag lump is vigorously mixed with a molten iron layer in the electric furnace.

Means for Solving the Problem

That is, the summary of the present invention is as follows.

(1) According to one aspect of the present invention, there is provided an electric furnace including: a cylindrical furnace wall; a furnace cover that is provided at an upper end of the furnace wall; and a furnace bottom that is provided at a lower end of the furnace wall and includes a deep bottom portion and a shallow bottom portion as a region having a height of 150 mm to 500 mm from a deepest point of the deep bottom portion, in which a slag pouring port into which molten slag or a solidified slag lump is capable of being poured from a slag transport container directly or through a tilting trough is provided, the slag pouring port overlaps the shallow bottom portion in a plan view, and the area ratio of the shallow bottom portion to the furnace bottom in a plan view is 5% to 40%.

(2) The electric furnace according to (1) may further include: a reducing material feeding nozzle that is provided at the furnace cover or at both the furnace cover and the furnace wall and through which a reducing material is added into the electric furnace; and an exhaust duct that is provided at the furnace cover.

(3) In the electric furnace according to (1) or (2), the slag pouring port may be provided at the furnace cover and may be covered with an openable slag pouring door.

(4) The electric furnace according to (1) to (3), may further include: a slag hole that is provided at a position of the furnace wall higher than a maximum height of the shallow bottom portion and through which molten slag is discharged; and a tap hole that is provided at a position of the furnace wall lower than the shallow bottom portion and through which molten iron is discharged, in which the electric furnace may be a stationary type.

(5) The electric furnace according to any one of (1) to (3) may further include: a tilting portion that is configured to tilt the electric furnace; a slag hole that is provided at a position of the furnace wall higher than a maximum height of the shallow bottom portion and through which molten slag is discharged; and a furnace bottom tap hole that is provided at an extended position of the deep bottom portion and through which molten iron is discharged.

(6) In the electric furnace according to (5), the furnace cover may be movable between the upper end of the furnace wall and a lateral side of the furnace wall, and the slag pouring port may be an open portion that is formed above the furnace wall in a state where the furnace cover is moved to the lateral side of the furnace wall.

Effects of the Invention

With the above-described electric furnace, even in a case where molten slag or a solidified slag lump produced in a steelmaking step is poured from a slag transport container into the electric furnace directly or through a tilting trough without using the slag holding furnace disclosed in Patent Document 4, vigorous mixing between just-poured molten slag and a molten iron layer in the electric furnace can be prevented.

Therefore, the molten slag can be poured rapidly while preventing the occurrence of large slag foaming caused by a rapid reaction between the molten slag and the molten iron layer, and as a result, the internal atmosphere of the furnace can be maintained to be non-oxidizing during reduction, and the reduction treatment efficiency can be improved.

In addition, by directly pouring high-temperature solidified slag into the electric furnace, sensible heat of the solidified slag can be recovered, and typically required processes, for example, the crushing, electromagnetic separation, aging, and the like of the solidified slag are not necessary. As a result, all the target slag can be melted and reduced.

Further, irrespective of whether a stationary type electric furnace or a tilting type electric furnace that is widely used for melting an iron source is used, the object of the present invention can be achieved with a small modification. Therefore, the present invention is advantageous in that existing facilities can be easily converted for use.

EMBODIMENTS OF THE INVENTION

Hereinafter, the details of a preferred embodiment of the present invention will be described with reference to the accompanying drawings.

First, the summary of a slag treatment process according to an embodiment of the present invention in which an electric furnace is used will be described with reference to FIG. 1.

Figure 1:
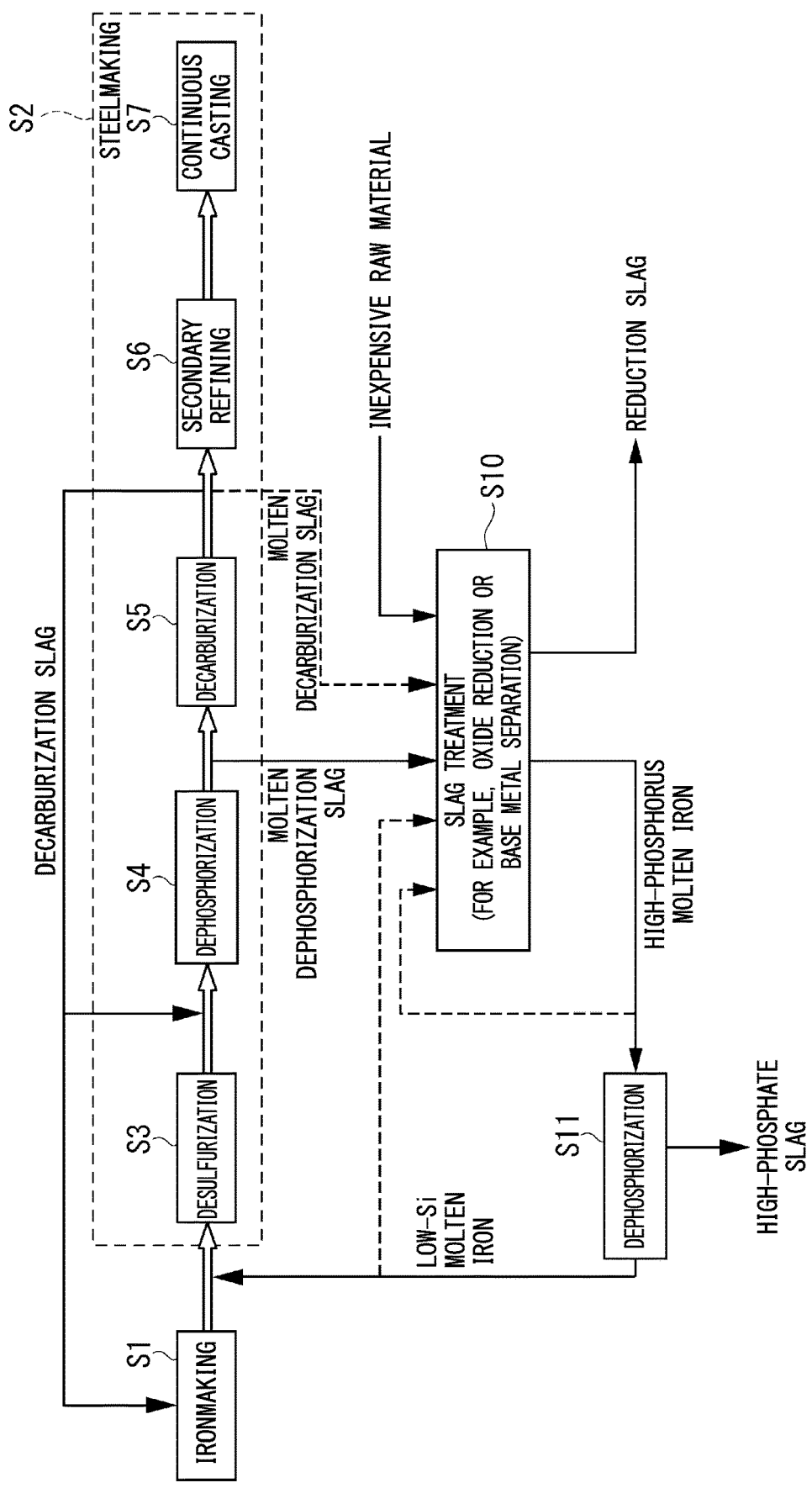
FIG. 1 is a diagram showing a slag treatment process.

As shown in FIG. 1, molten iron is produced using a blast furnace in an ironmaking step (S1), and pig iron is refined into steel using a converter or the like in a steelmaking step (S2).

In addition, the steelmaking step (S2) includes: respective steps of desulfurization, dephosphorization, and decarburization of removing sulfur, phosphorus, carbon, and the like in the molten iron; a secondary refining step (S6) of removing gas such as hydrogen, sulfur, and the like remaining in the molten steel to adjust components; and a continuous casting step (S7) of casting the molten steel in a continuous casting machine.

In the steelmaking step (S2), the dephosphorization step (S4) and the decarburization step (S5) are mainly performed using a converter.

Molten iron is refined in a converter by using a flux containing calcium oxide as a major component.

At this time, oxides are produced by oxidizing C, Si, P, Mn, and the like in molten iron with oxygen which is blown into the converter. These oxides are bonded to calcium oxide to produce slag.

In addition, in the respective steps of desulfurization, dephosphorization, and decarburization step (S3, S4 S5), various kinds of slags (desulfurization slag, dephosphorization slag, and decarburization slag) are produced.

In the description of this specification, the slags produced in the steelmaking step will be collectively called "steelmaking slag". The steelmaking slag is a concept including desulfurization slag, dephosphorization slag, and decarburization slag.

In addition, steelmaking slag which is in a molten state and has a high temperature will be referred to as "molten slag". Likewise, desulfurization slag, decarburization slag, and dephosphorization slag which are in a molten state will be referred to as "molten desulfurization slag", "molten dephosphorization slag", and "molten decarburization slag", respectively.

In the slag treatment step (S10), the molten slag produced in the steelmaking step (S2) is transported from the converter to an electric furnace while maintaining the molten state thereof, and is continuously reduced, melted, and reformed in the electric furnace. As a result, valuable materials (valuable elements such as Fe and P) in the molten slag are collected into a molten iron layer as a layer positioned below a molten slag layer.

At this time, in the electric furnace, for example, a treatment of reducing oxides such as Fe and P in the molten slag, a treatment of separating iron powder (iron) from the slag, or a treatment of adjusting the basicity of the slag is performed.

As a result, high-phosphorus molten iron containing phosphorus and the like is separated and collected from the molten slag. In addition, the molten slag as the steelmaking slag is reduced and reformed, and high-quality reducing slag corresponding to blast furnace slag is collected.

The amounts of FeO, $P_2O_5$, and the like in this reducing slag are lower than that before reduction. Therefore, the reduction slag can be effectively recycled as, for example, a cement raw material or a ceramic product.

In addition, by adjusting the components of the molten slag such that the basicity thereof is low, the expansibility is low. Therefore, the reduction slag can be used as a base course material or an aggregate.

Further, the dephosphorization treatment (S11) is performed on the collected high-phosphorus molten iron such that P in the molten iron is oxidized and moves into the molten slag. As a result, the high-phosphorus molten iron is separated into high-phosphate slag and molten iron.

The high-phosphate slag can be utilized as, for example, a phosphate fertilizer or a phosphate raw material.

In addition, the molten iron is recycled in the steelmaking step (S2) and is poured into the converter or the like.

Hereinafter, the summary of the slag treatment process according to the embodiment will be described.

In this process, it is preferable that the molten dephosphorization slag among various molten slags produced in the steelmaking step (S2) is used as a treatment target.

The molten dephosphorization slag has a lower temperature than the molten decarburization slag and contains a large amount of iron powder and phosphoric acid.

Therefore, the molten dephosphorization slag is melted and reformed not in the oxidation treatment but in the reduction treatment. As a result, the collection efficiency of valuable elements (for example, Fe and P) in the process is improved.

Therefore, in the following description, an example in which the molten dephosphorization slag is mainly used as a molten slag to be treated will be described.

However, the molten slag according to the present invention is not limited to the molten dephosphorization slag, and any steelmaking slag such as molten desulfurization slag or molten decarburization slag produced in the steelmaking step can be used.

Next, an electric furnace 1 used in the slag treatment step (S10) of the slag treatment process will be described with reference to FIGS. 2 to 7.

The electric furnace 1 is a furnace in which a molten iron layer 6 and a molten slag layer 5 are formed in S10.

The electric furnace 1 includes a furnace bottom 11, a cylindrical furnace wall 12, and a furnace cover 13.

An inner surface of each of the furnace bottom 11, the furnace wall 12, and the furnace cover 13 is lined with refractory.

In a first embodiment and a second embodiment shown in FIGS. 2 to 6, a slag pouring port 14 is formed at the furnace cover 13.

Figure 2:
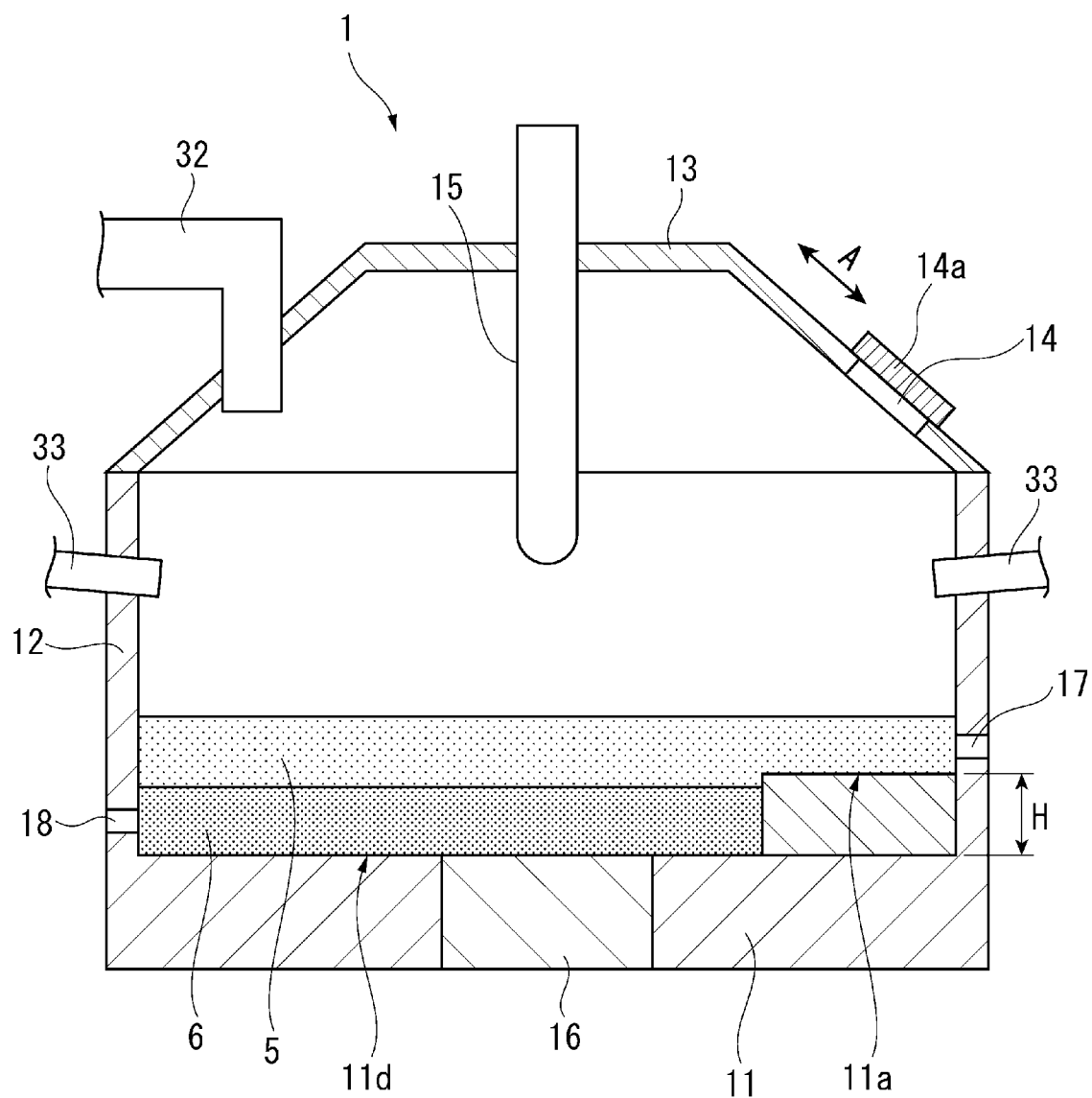
FIG. 2 is a vertical cross-sectional view showing an electric furnace according to a first embodiment.

The slag pouring port 14 is covered with an openable slag pouring door 14a that is movable in an A direction of FIG. 2.

The electric furnace 1 is closed except the slag pouring port 14 such that the internal temperature of the furnace can be maintained.

Molten slag 4 or a solidified slag lump 4a can be added from a slag transport container into the slag pouring port 14 directly or through a tilting trough.

Figure 7:
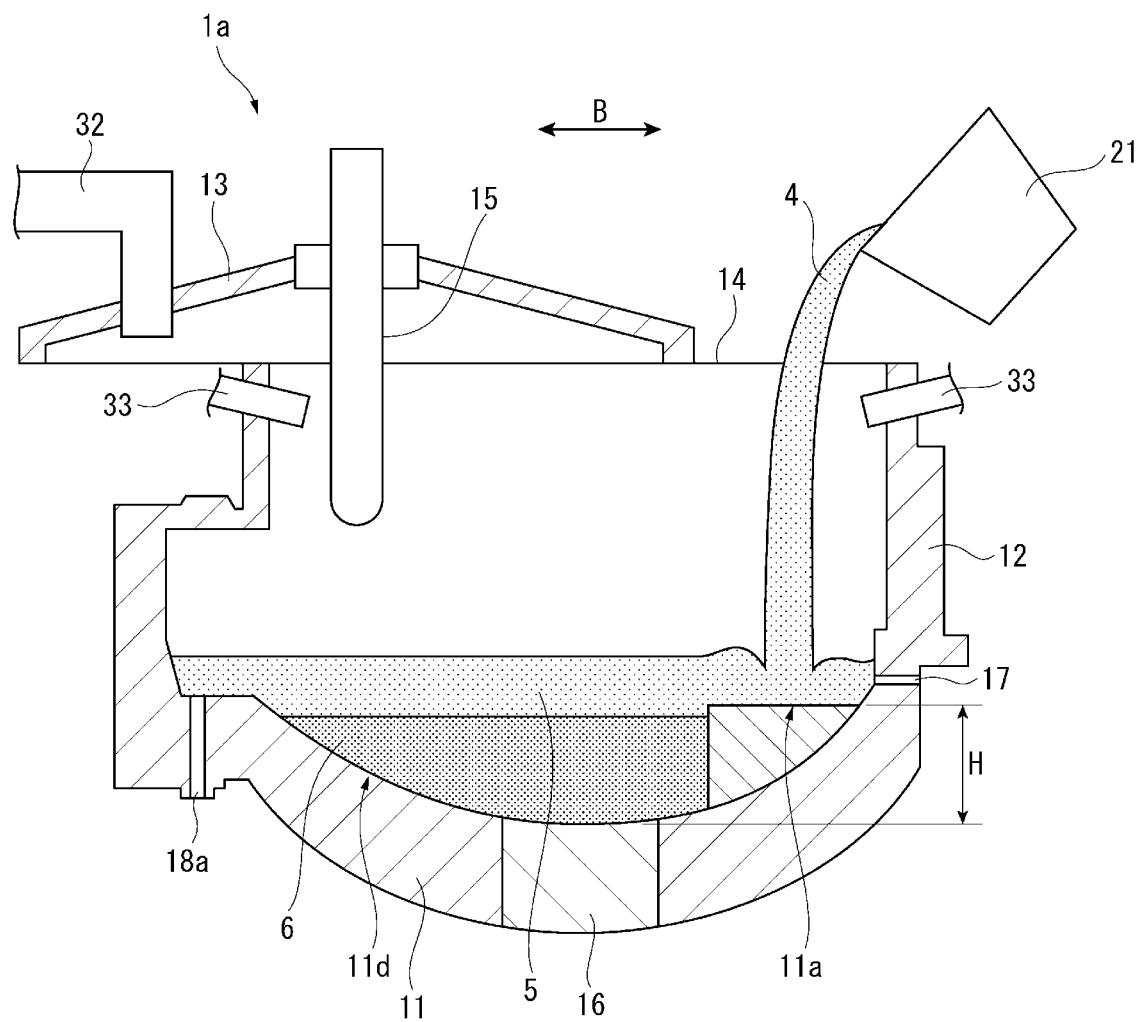
FIG. 7 is a vertical cross-sectional view showing an electric furnace according to a third embodiment.

In a third embodiment shown in FIG. 7, an open portion is formed above the furnace wall 12 in a state where the furnace cover 13 is moved to a lateral side of the furnace wall 12, and this open portion forms the slag pouring port 14.

Figure 4:
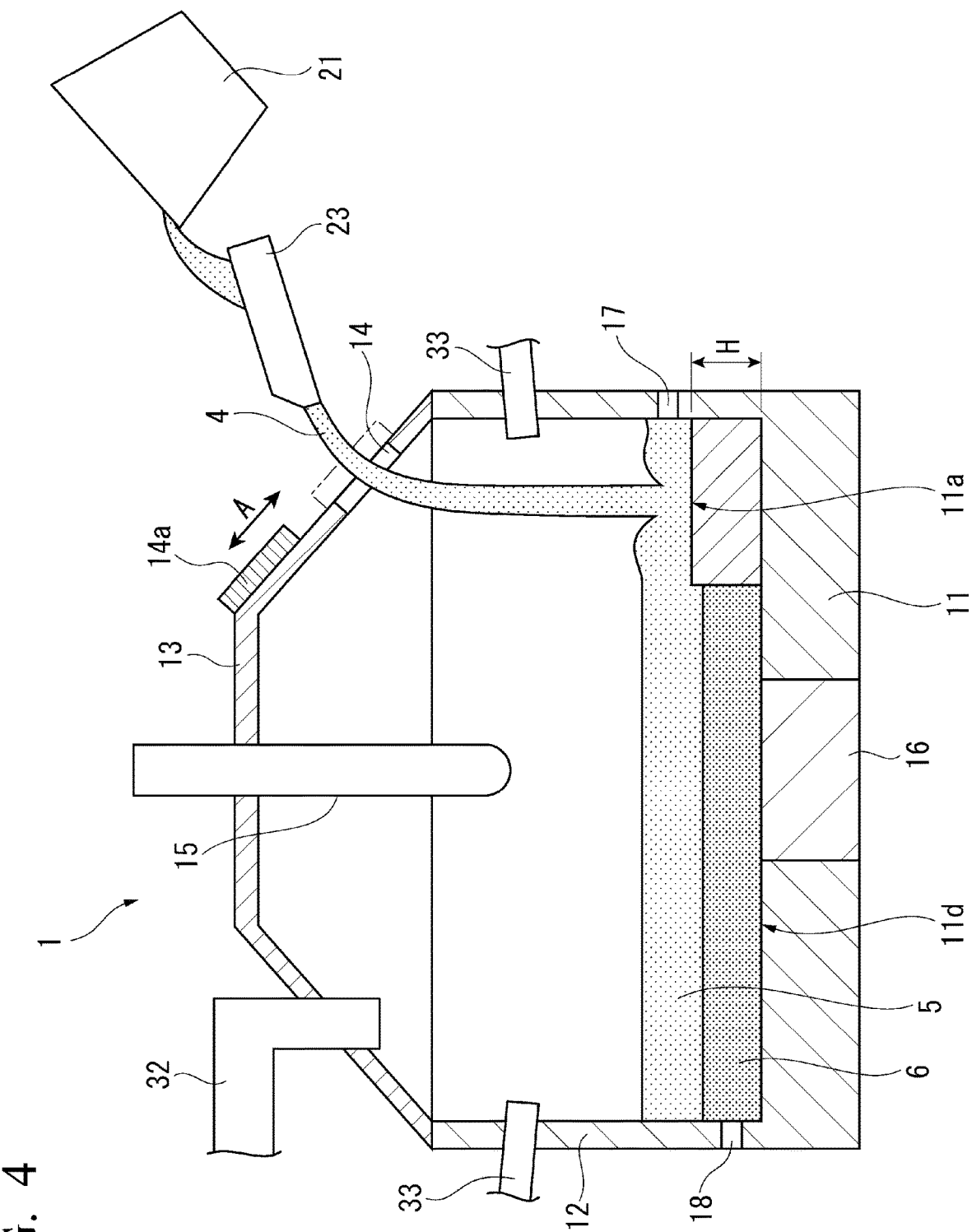
FIG. 4 is a schematic diagram showing a case where molten slag is poured into the electric furnace.
Figure 5:
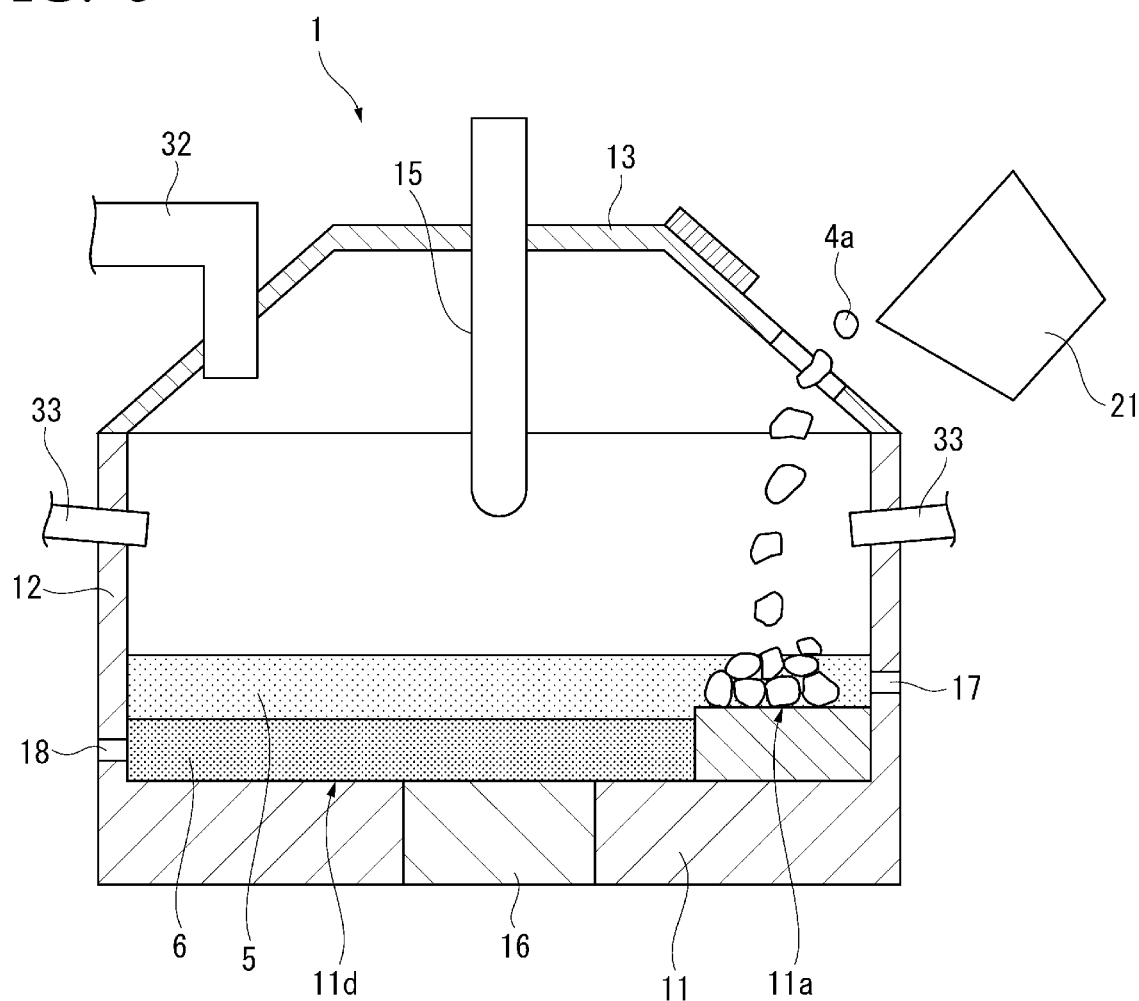
FIG. 5 is a schematic diagram showing a case where a solidified slag lump is poured into the electric furnace.
Figure 6:
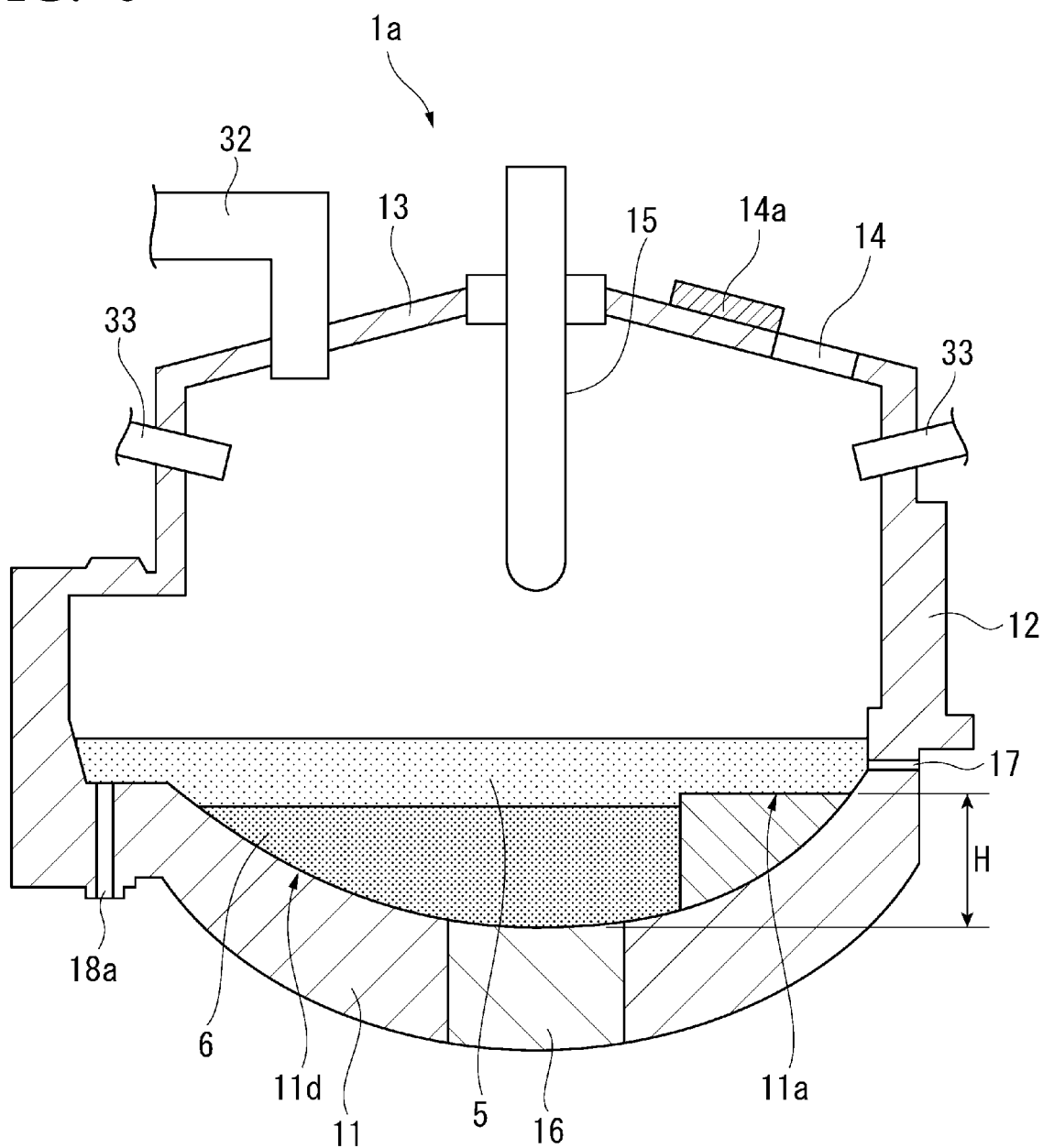
FIG. 6 is a vertical cross-sectional view showing an electric furnace according to a second embodiment.

In addition, FIGS. 2 to 5 show a stationary type direct current furnace as an example of the electric furnace 1, and FIGS. 6 and 7 show a tilting type direct current furnace as an example of the electric furnace 1. However, an alternating current furnace may be used.

First, the stationary type direct current furnace according to the first embodiment shown in FIGS. 2 to 5 will be described.

At the center of the electric furnace 1, an upper electrode 15 and a furnace bottom electrode 16 are disposed to vertically face each other.

A direct current voltage is applied to the upper electrode 15 and the furnace bottom electrode 16 to generate arc discharge between the upper electrode 15 and the furnace bottom electrode 16. As a result, energy required for reducing the molten slag 4 is supplied.

A reducing material feeding nozzle 33 is formed at the furnace wall 12.

The reducing material feeding nozzle 33 is a device that supplies auxiliary raw materials such as a reducing material and a reforming material required for the reduction treatment of the molten slag 4.

As the reducing material, for example, a powdered carbon material such as coke breeze, anthracite culm, or graphite powder is used.

The reducing material may be means for reducing the occurrence of slag foaming.

The reforming material mainly adjusts the $SiO_2$ or $Al_2O_3$ concentration in the slag and silica sand, fly ash, or waste refractory powder can be used therefor.

The reducing material feeding nozzle 33 may be a means for reducing the occurrence of slag foaming.

The reducing material feeding nozzle 33 may be formed at both the furnace wall 12 and the furnace cover 13.

A duct 32 as an exhaust duct is provided at the furnace cover 13.

The furnace bottom 11 includes a deep bottom portion 11d and a shallow bottom portion 11a having a shallower bottom than the deep bottom portion 11d.

The shallow bottom portion 11a is provided close to the furnace wall 12 assuming that the shallow bottom portion 11a is exposed from the surface of the molten iron layer 6 when the molten slag 4 or the solidified slag lump 4a is charged into the electric furnace 1.

During the slag treatment, not only molten slag but also molten iron or molten steel may be charged into the electric furnace, and molten iron may be produced along with the slag reduction. Therefore, the height of the molten iron layer 6 increases.

Once the molten iron layer becomes thicker to some extent or more, a tap hole 18 that discharges molten iron is opened to reduce the height of the molten iron layer 6. Therefore, it is assumed that, after the height of the molten iron layer 6 is reduced, the shallow bottom portion 11a is exposed from the molten iron layer 6 such that molten slag for the next reduction treatment is charged into the electric furnace 1 in the above state.

Even in a case where the shallow bottom portion 11a is not exposed from the molten iron layer 6, the molten slag can be charged into the electric furnace 1. As long as the height of the molten iron layer is low to some extent on the shallow bottom portion 11a, vigorous mixing between the charged molten slag 4 and the molten iron layer 6 can be reduced, and thus the object of the present invention can be achieved.

In the first embodiment, a case where the electric furnace 1 has a circular cross-section will be described with reference to FIGS. 2 to 5.

The shallow bottom portion 11a is a portion that is raised assuming that the furnace bottom 11 is positioned above the thickness of the molten iron layer 6 when the molten slag 4 or the solidified slag lump 4a is charged into the electric furnace 1. The shallow bottom portion 11a is a portion obtained by partially raising a region of the furnace bottom 11 that overlaps the slag pouring port 14 in a plan view.

In other words, in a plan view, a region where the shallow bottom portion 11a is present and a region where the slag pouring port 14 is present partially or wholly overlap each other.

Instead of using the slag holding furnace, the molten slag 4 or the solidified slag lump 4a produced in the steelmaking step is charged from a slag transport container 21 into the electric furnace 1 directly or through a tilting trough 23.

The molten slag 4 or the solidified slag lump 4a flows through the slag pouring port 14. Therefore, the molten slag flowing from a pouring hole falls down toward the shallow bottom portion 11a.

That is, the shallow bottom portion 11a includes a position where the molten slag 4 or the solidified slag lump 4a flows and falls down from the slag pouring port 14.

The shallow bottom portion 11a is formed, for example, by forming the furnace bottom 11 to become shallow stepwise.

The shallow bottom portion 11a is formed of refractory as in the case of the inner surfaces of the other portions of the furnace bottom 11.

The slag pouring port 14 is formed at the furnace cover 13.

In FIGS. 2 to 5, the shallow bottom portion 11a is formed by forming the furnace bottom 11 to become shallow in one step. However, the shallow bottom portion 11a is not limited to this shape.

For example, the shallow bottom portion 11a may be formed by forming the furnace bottom 11 to become shallow in two or more steps. Alternatively, the shallow bottom portion 11a may be formed by forming a continuous slope instead of forming the furnace bottom 11 stepwise.

In addition, the shallow bottom portion 11a does not necessarily have a horizontal surface as shown in FIG. 2.

The entire area of the shallow bottom portion 11a may have a stepwise shape or a slope shape as long as the shallow bottom portion 11a positioned below the slag pouring port 14 is a region having a height of 150 mm to 500 mm from a deepest point of the deep bottom portion 11d and an area ratio of the shallow bottom portion 11a to the furnace bottom 11 in a plan view is 5% to 40%.

It is preferable that the shallow bottom portion 11a has a horizontal surface from the viewpoint that the area ratio of the shallow bottom portion 11a to the furnace bottom 11 in a plan view can be secured to be 5% or higher without reducing the inner volume of the furnace more than necessary.

As shown in FIGS. 4 to 6, on a basic assumption, in a case where the molten slag 4 or the solidified slag lump 4a is poured from the slag transport container 21 or the slag transport container 21 into the electric furnace 1 through the tilting trough 23, the molten slag 4 is poured from the slag pouring port 14 and falls down toward the molten slag layer 5.

The molten slag layer 5 is disturbed by the falling molten slag 4. At the falling position, however, the shallow bottom portion 11a is present, and the molten iron layer 6 is not present below the molten slag layer 5. Therefore, the just-poured molten slag 4 does not come into contact with the molten iron layer 6.

Accordingly, the occurrence of slag foaming caused by a rapid reaction between the just-poured molten slag 4 and the molten iron layer 6 can be prevented.

As shown in FIG. 2, the shallow bottom portion 11a is a region having a height H of 150 mm to 500 mm from the deepest point of the deep bottom portion 11d.

The reason is for this is that, in a case where the height is 150 mm or more, an effect of alleviating vigorous mixing between the molten slag 4 that is newly poured and the molten iron layer 6 that is originally present can be expected.

In addition, the reason why the height from the deepest point of the deep bottom portion 11d is 500 mm or less is that it is not necessary to set the height to be more than 500 mm, and in a case where the height is more than 500 mm, there is an adverse effect in that the inner volume of the furnace decreases.

Figure 3:
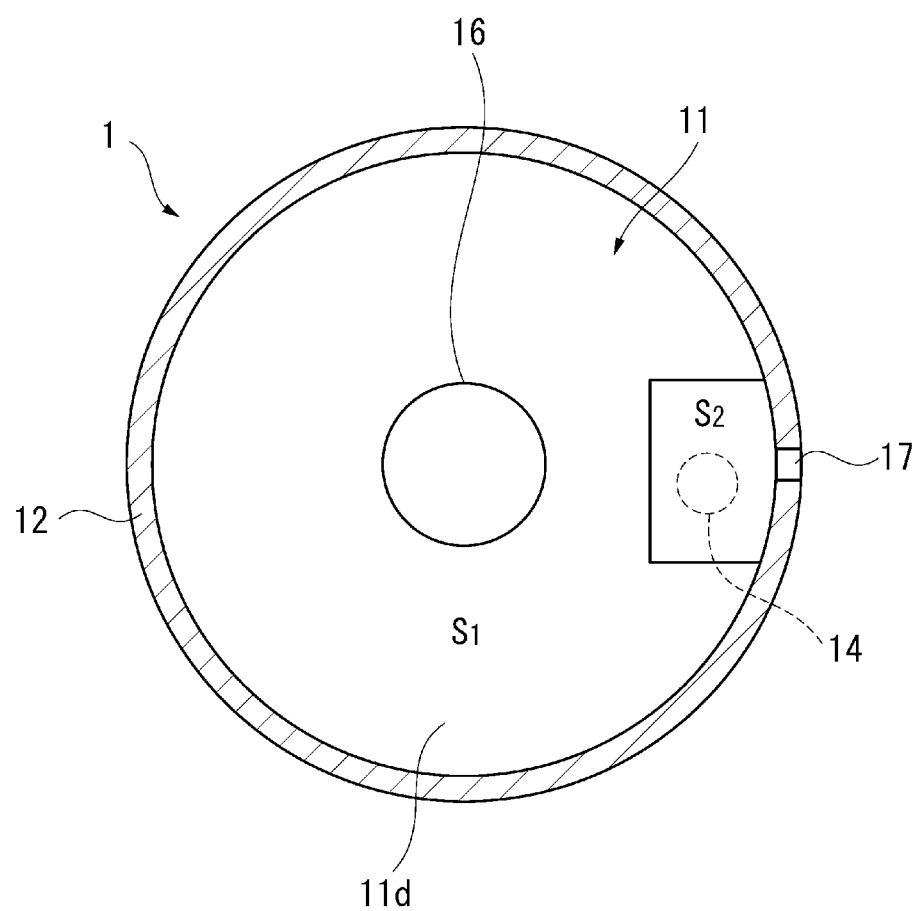
FIG. 3 is a cross-sectional view at a height of 150 mm from a furnace bottom of FIG. 2.

As shown in FIG. 3, in a case where the area of the deep bottom portion 11d in a plan view is represented by $S_1$ and the area of the shallow bottom portion 11a in a plan view is represented by $S_2$, the area ratio of the shallow bottom portion 11a to the furnace bottom 11 in a plan view (($S_2$/($S_1$+$S_2$))×100) is preferably 5% to 40%.

By adjusting the area ratio to be 5% or higher, the proportion of the molten slag 4 or the solidified slag lump 4a that can exhibit the mixing alleviation effect can be secured such that the occurrence of vigorous foaming in the entire slag can be reduced.

In a case where the area ratio is higher than 40%, the effect of reducing the occurrence of foaming is not likely to be improved, whereas the amount of molten iron stored as the molten iron layer 6 or the area of an interface between the molten iron layer 6 and the molten slag layer 5 is reduced. Therefore, the reduction efficiency may decrease.

In addition, in a case where the area ratio is higher than 40%, the shallow bottom portion 11a is included in a high current density region of the furnace bottom 11. Therefore, the shallow bottom portion 11a is likely to be consumed.

In the present invention, the shallow bottom portion 11a is defined as "region having a height H of 150 mm to 500 mm from the deepest point of the deep bottom portion 11d". Therefore, the boundary between $S_1$ and $S_2$ is a position where the height H from the deepest point of the deep bottom portion 11d is 150 mm.

In addition, in FIGS. 4 and 5, the shallow bottom portion 11a is exposed from the molten iron layer 6 and is immersed in the molten slag layer 5. However, the shallow bottom portion 11a may be exposed from the molten slag layer 5.

In this case, the molten slag 4 or the solidified slag lump 4a charged from the slag pouring port 14 collides against the surface of the shallow bottom portion 11a and subsequently flows down from the surface of the shallow bottom portion 11a toward the molten slag layer 5.

Since the molten slag 4 collides against the surface of the shallow bottom portion 11a, the kinetic energy is canceled out. Therefore, the molten slag 4 or the solidified slag lump 4a is not vigorously mixed from the shallow bottom portion 11a into the molten iron layer 6.

Accordingly, a vigorous reaction between the molten slag 4 or the solidified slag lump 4a and the molten iron is also reduced, and slag foaming is reduced.

Here, in a case where the solidified slag lump 4a is poured, a case where the solidified slag lump 4a is deposited on the shallow bottom portion 11a first as shown in FIG. 5 is assumable. At this time, in a state where solidified slag lump 4a is immersed in the molten slag layer 5, the solidified slag lump 4a is melted in the molten slag layer 5 and then moves to an upper region of the molten iron layer 6. Therefore, the solidified slag lump 4a does not come into direct contact with molten iron layer 6, and a vigorous reaction between FeO and the like in the solidified slag lump 4a and C in the molten iron is avoidable, and slag foaming can be prevented.

Further, by providing the shallow bottom portion 11a, the pouring rate of the molten slag 4 or the solidified slag lump 4a can be increased as compared to a structure where the shallow bottom portion 11a is not provided. Therefore, the time required to open the furnace during the pouring of the slag can be reduced.

Accordingly, the time during which the reducing atmosphere can be maintained in a state where the inside of the furnace is closed can be increased, and an effect of increasing the reduction rate can also be obtained.

Even in a case where the mixing between the molten slag 4 and the molten iron layer 6 in the electric furnace 1 is reduced, depending on the shallow bottom portion 11a of the furnace bottom 11, (T.Fe) in the molten slag layer 5 increases, the slag at the interface between the molten iron layer 6 and the molten slag layer 5 reacts with C in the molten iron to produce CO gas, which may induce slag foaming.

Even in this case, by feeding carbon powder from the reducing material feeding nozzle 33, foaming can be reduced through defoaming and reduction of foamed slag.

In addition, at the furnace wall 12, preferably, a slag hole 17 for discharging reducing slag and a tap hole 18 for discharging molten iron are provided.

The slag hole 17 is formed at a position corresponding to the molten slag layer 5, specifically, at a position higher than the maximum height of the shallow bottom portion 11a, and the tap hole 18 is formed at a position corresponding to the molten iron layer 6.

Next, the second embodiment will be described with reference to FIG. 6.

The second embodiment is different from the first embodiment in that the electric furnace is a tilting furnace.

In the second embodiment, elements having the same functions as those of the first embodiment are represented by the same reference numerals, and elements different from those of the first embodiment will be mainly described.

As shown in FIG. 6, an electric furnace 1a according to the second embodiment is a tilting furnace.

The electric furnace 1a includes: a tilting portion (not shown) that moves the electric furnace 1a; the slag hole 17 that is provided at a position of the furnace wall 12 higher than the deep bottom portion 11d and through which the molten slag 4 is discharged; and a furnace bottom tap hole 18a that is provided at a position confronting the slag hole 17 on an extended position of the deep bottom portion 11d and through which the molten iron in the molten iron layer 6 is discharged by tilting.

This way, the electric furnace 1 may be a tilting furnace.

Next, the third embodiment will be described with reference to FIG. 7.

The third embodiment is different from the second embodiment, in that the furnace cover 13 is movable between an upper end of the furnace wall 12 and a lateral side of the furnace wall 12.

In the third embodiment, elements having the same functions as those of the first embodiment are represented by the same reference numerals, and elements different from those of the first embodiment will be mainly described.

As shown in FIG. 7, in the electric furnace 1a according to the third embodiment, the furnace cover 13 is movable between the upper end of the furnace wall 12 and the lateral side of the furnace wall 12 in a B direction of FIG. 7.

The movement locus of the furnace cover 13 may be linear or arc-shaped.

The furnace cover 13 having an arc-shaped movement locus is a rotary furnace cover.

In a state where the furnace cover 13 is positioned at the upper end of the furnace wall 12, the inside of the electric furnace 1 is closed as shown in FIG. 2.

In a state where the furnace cover 13 is moved to the lateral side of the furnace wall 12, an open portion is formed above the furnace wall 12 as shown in FIG. 7, and this open portion forms the slag pouring port 14.

This way, the slag pouring port 14 is not necessarily provided at the furnace cover 13, and by moving the furnace cover 13 relative to the furnace wall 12, the open portion can be formed to form the slag pouring port 14.

EXAMPLES

Hereinafter, the present invention will be described in detail based on Examples, but the present invention is not limited to Examples.

(Simulation)

First, using a universal fluid analysis software FLUENT (registered trade name), the molten slag 4 was poured into an electric furnace under the following conditions, and the behavior thereof was observed in an axial cross-sectional direction of the furnace.

Figure 8:
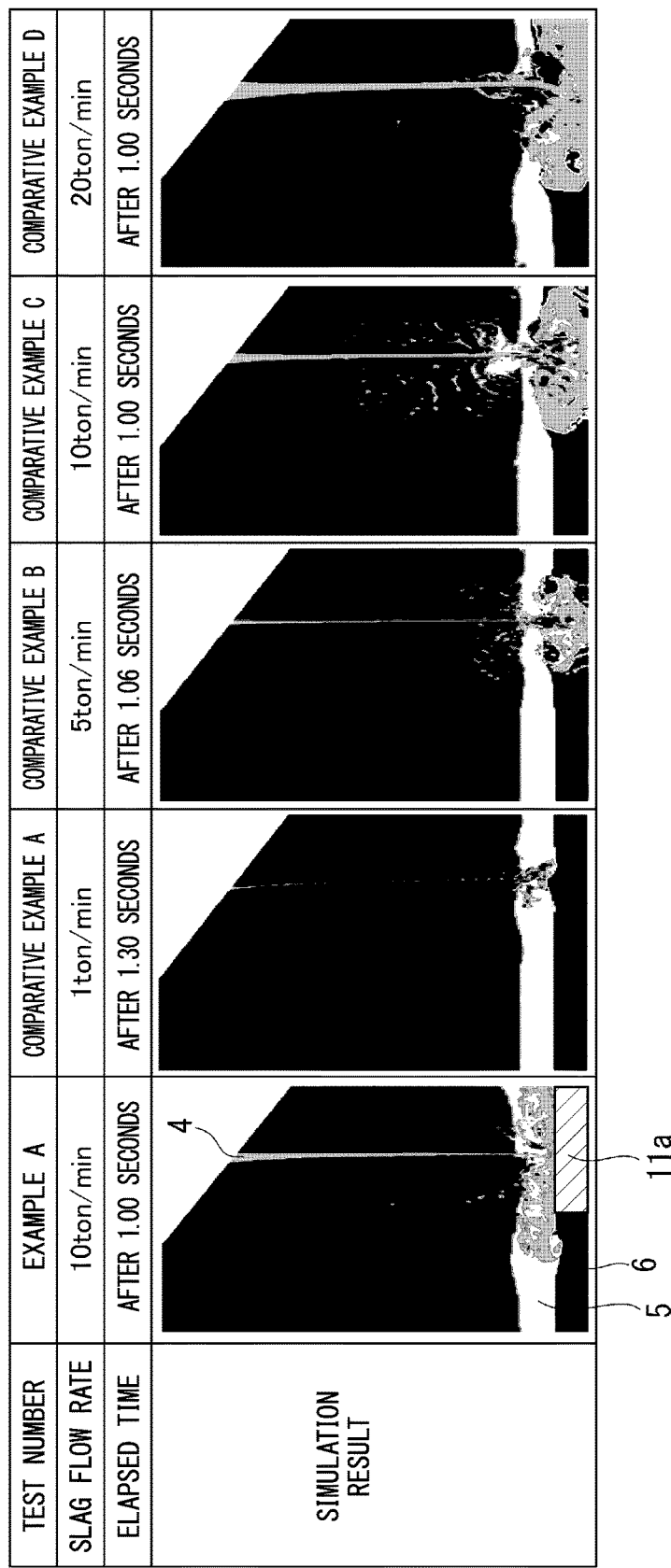
FIG. 8 is a diagram showing the result of a simulation of pouring molten slag into an electric furnace.

Volume of Furnace: 13.8 m$^3$
Furnace Bottom Area ($S_1+S_2$): 7.5 m$^2$
Slag Viscosity in Furnace: 0.25 Pa·s
Poured Slag Viscosity: 1.0 Pa·s
Molten Iron Viscosity: 0.006 Pa·s
Height of Shallow Bottom Portion (H): 250 mm
Area of Shallow Bottom Portion (S2): 1.1 m$^2$
Amount of Molten Seed: 1.4 m$^3$
Width of Poured Slag Flow: 500 mm
Slag Pouring Rate: 1 t/min, 5 t/min, 10 t/min, 20 t/min
The results are shown in FIG. 8.

As shown in FIG. 8, at the slag pouring rate of 1 t/min, even in a case where the shallow bottom portion 11a was not provided, the poured molten slag 4 did not substantially reach the molten iron layer 6, and only a reaction between the poured slag and the molten iron layer was observed.

At the slag pouring rates of 1 t/min, 5 t/min, 10 t/min, and 20 t/min, in a case where the shallow bottom portion 11a was not provided, the poured molten slag 4 reached the molten iron layer 6, and a part of the molten slag 4 penetrated into the molten iron layer and reacted with C in the molten iron.

In particular, it was found that, at 10 t/min and 20 t/min, the reaction was vigorous and the molten iron and the molten slag were mixed with each other, and the mixture thereof was scattered.

On the other hand, in a case where the shallow bottom portion 11a is provided, even at the slag pouring rate of 10 t/min, the poured molten slag 4 did not substantially react with the molten iron layer 6. Accordingly, it is considered that the mixture of the molten iron and the molten slag 4 was not scattered.

It was found from the above result that, by providing the shallow bottom portion 11a, the poured molten slag 4 and the molten iron layer 6 can be prevented from being mixed with each other and reacting with each other.

Example 1

Figure 9:
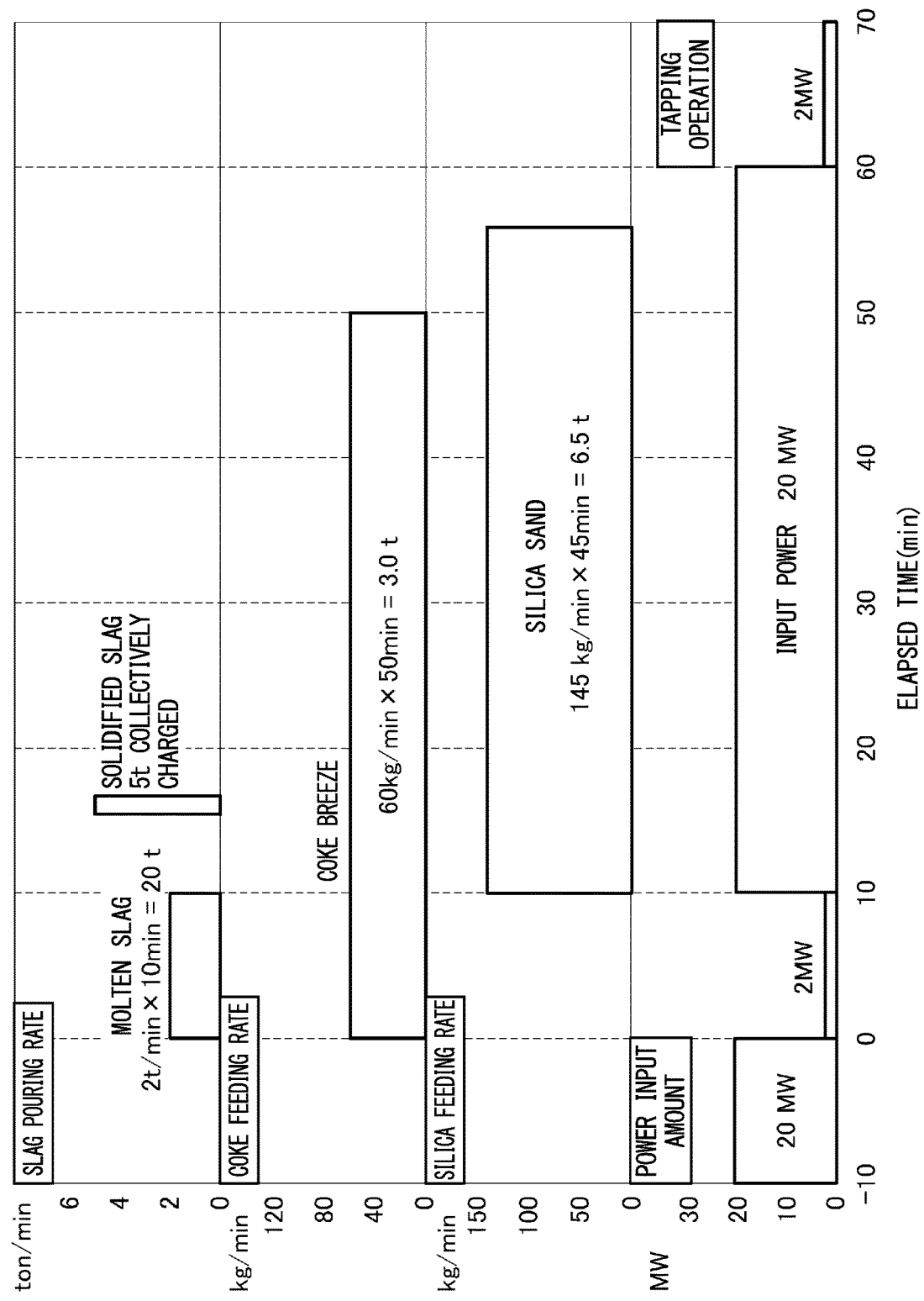
FIG. 9 is a diagram showing operation patterns in Examples 1 and 3 according to the present invention.

Next, a real operation was performed under conditions shown in FIG. 9 by using the electric furnace 1 shown in FIGS. 2 to 5 as a reduction reformer.

Specific procedures are as follows.

First, as the electric furnace 1, a closed stationary type direct current electric furnace having a furnace inner diameter of 6 m was used, in which the slag pouring port 14 including the openable slag pouring door 14a for pouring the molten slag 4 and the solidified slag lump 4a was provided at a part of a water-cooling furnace cover.

In the electric furnace 1, the shallow bottom portion 11a formed of refractory and having a height of 450 mm from the furnace bottom deepest point was provided immediately below the slag pouring port 14.

The shallow bottom portion 11a was a block formed of refractory having a shape in which one end was in contact with the furnace wall 12 and the inside of the furnace was rectangular.

The area ratio of the shallow bottom portion 11a to the furnace bottom in a plan view was 10%.

The duct 32 for exhausting exhaust gas was provided at the furnace cover 13, and the duct 32 was connected to a combustible gas cooling dust collector.

A lower end of the tap hole 18 was set at a height of 250 mm from the furnace bottom deepest point, and a lower end of the slag hole 17 was set at a height of 450 mm from the furnace bottom deepest point.

Residues remaining in the furnace at this time (before the pouring of the slag) include 54 t of molten iron containing 2.6% of [C] and 25 t of molten slag reduced until (T.Fe) was 1%.

Next, by opening the slag pouring door 14a, 20 t of the molten slag 4 ((T.Fe) was 18%) transported from the converter was continuously poured from the slag transport container 21 into the electric furnace 1 through a moving slag runner for 10 minutes.

Accordingly, the average pouring rate was 2 t/min.

During the pouring of the slag, the input power was reduced up to 2 MW to suppress the reaction and was returned to 20 MW after the completion of the pouring.

The level of the molten slag layer 5 positioned at a height of 630 mm from the furnace bottom 11 before the pouring of the molten slag 4 increased up to a level of higher than 1200 mm during the pouring. However, although the slag was poured for a short period of time of 10 minutes, boiling caused by mixing between the molten slag 4 and the molten iron layer 6 did not occur, and the pouring was able to be stably completed.

After the start of the pouring of the molten slag 4, coke breeze was supplied through the reducing material feeding nozzle 33 of the furnace cover 13 at 60 kg/min, and the supply of 3.0 t of coke breeze was completed for 50 minutes after the start of the pouring of the molten slag 4.

After the pouring of the molten slag 4, the slag pouring door 14a was temporarily closed. After 5 minutes, the slag pouring door 14a was opened again, and 5 t of the solidified slag lump 4a was poured at once.

The solidified slag lump 4a was slag that was attached to the slag transport container 21 and solidified during the pouring of the molten slag 4 and was maintained at 950° C.

The charged solidified slag lump 4a was deposited on the shallow bottom portion 11a in the molten slag layer 5 in the furnace without coming into contact with the molten iron layer 6 and was melted in the molten slag layer 5 over time.

After the charging of the solidified slag lump 4a, the slag pouring door 14a was rapidly closed to secure the sealability in the furnace, and coke breeze was added in a reducing gas atmosphere to perform the slag reduction treatment.

After 60 minutes from the start of the pouring of the molten slag including a sedation time of 10 minutes from the completion of the addition of the coke breeze, (T.Fe) in the slag was able to be reduced to be 1% or lower.

The reason for this is presumed to be that, since the inside of the furnace was closed after a short period of time of the pouring of the slag, the inside of the furnace was able to be maintained in the reducing atmosphere during the reduction such that the reduction progressed.

In the meantime, in order to reduce the basicity ((CaO)/(SiO$_2$)) of the slag to an appropriate level of 1.2, 6.5 t of silica sand was supplied from the reducing material feeding nozzle 33.

After the completion of all the treatments, the slag hole was opened using an opening machine, 23 t of the reducing slag was discharged to the outside of the furnace, and the slag hole was closed with a mud gun.

On the other hand, after pouring the molten slag 4 into the electric furnace 1 for 10 minutes, the solidified slag lump 4a attached to the slag transport container 21 was discharged to a floor mold, was charged into a chute for charging a slag lump, and was weighed. The weight was about 6 t.

While maintaining the solidified slag lump 4a at a high temperature, the solidified slag lump was charged into the electric furnace 1 as it is using the chute immediately after the next pouring of the molten slag 4.

This operation was repeated five times. In a case where the total amount of the molten slag 4 and the solidified slag lump 4a charged reached 120 t, the tap hole 18 was opened to discharge 27 t of the molten iron, and 54 t of the molten iron remained in the furnace.

The estimated height of the molten iron layer 6 before tapping was 440 mm from the furnace bottom 11 but was reduced up to 300 mm after the discharge.

The following was found from the above result. By using the electric furnace 1 including the shallow bottom portion 11a, even in a case where the slag was poured within a short period of time, foaming does not occur, and the reduction is performed in a reducing atmosphere by closing the furnace after the completion of the pouring of the slag. Therefore, the reduction reforming can be performed using the molten slag 4 and the solidified slag lump 4a.

Example 2

Figure 10:
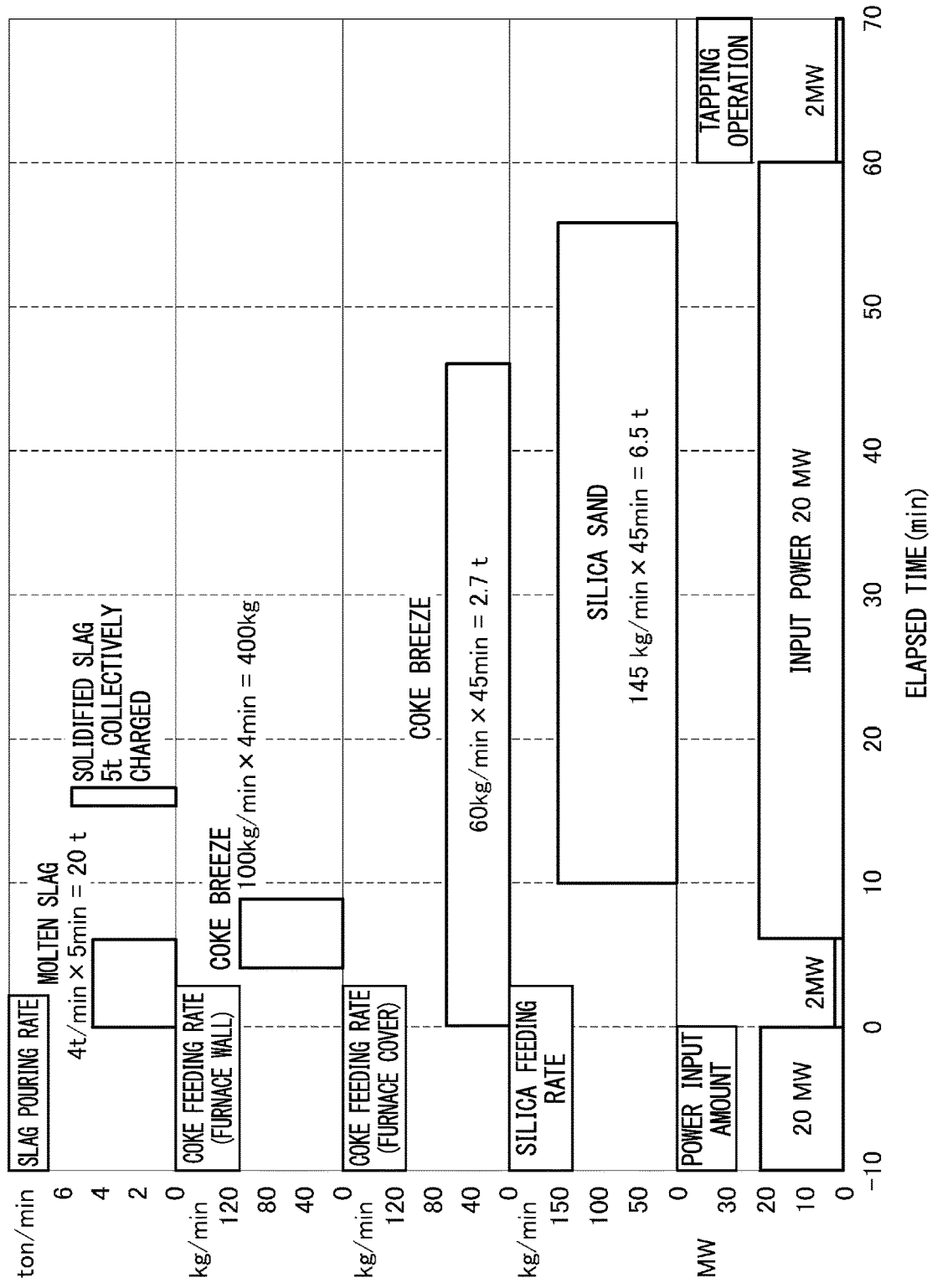
FIG. 10 is a diagram showing an operation pattern in Example 2 according to the present invention.

Next, an operation was performed under conditions different from those of Example 1 as shown in FIG. 10 by using the electric furnace 1 shown in FIGS. 2 to 5 as a reduction reformer.

Specific procedures are as follows.

In the first embodiment, 20 t of the molten slag 4 was continuously poured into the electric furnace 1 for 10 minutes. On the other hand, in Example 2, 20 t of the molten slag 4 was continuously poured into the electric furnace 1 for 5 minutes.

Accordingly, the pouring rate was two times that of Example 1, and the pouring time was half of that of Example 1.

The slag level in the furnace positioned at a height of about 630 mm from the furnace bottom 11 before the pouring of the molten slag 4 rapidly increased up to a level of 1500 mm or higher at the end of the pouring. Therefore, coke breeze was blown to the vicinity of the molten iron flow from the reducing material feeding nozzles 33 provided at two positions of the furnace wall 12 at 100 kg/min.

As a result, the slag level started to decrease, and subsequently the pouring was able to be stably completed. Therefore, after 4 minutes, the blowing of the coke breeze from the reducing material feeding nozzles 33 was stopped.

Conditions of the feeding of the coke breeze from the furnace cover 13, conditions of the charging of the solidified slag lump 4a, and the like are the same as those of Example 1.

After 60 minutes from the start of the pouring of the molten slag 4 including a sedation time of 15 minutes from the completion of the feeding of the coke breeze, (T.Fe) in the slag was able to be reduced to be 1% or lower.

In the meantime, in order to reduce the basicity ((CaO)/(SiO$_2$)) of the slag to an appropriate level of 1.2, 6.5 t of silica sand was supplied from the reducing material feeding nozzle 33.

After the completion of all the treatments, the slag hole 17 was opened using an opening machine, 23 t of the reducing slag was discharged to the outside of the furnace, and the slag hole was closed with a mud gun.

On the other hand, after pouring the molten slag 4 into the electric furnace 1 for 5 minutes, the solidified slag lump 4a attached to the slag transport container 21 was discharged to a floor mold, was charged into a chute for charging a slag lump, and was weighed. The weight was about 6 t.

While maintaining the solidified slag lump 4a at a high temperature, the solidified slag lump was poured into the electric furnace 1 as it is using the chute immediately after the next pouring of the molten slag 4.

This operation was repeated five times. In a case where the total amount of the molten slag 4 and the solidified slag lump 4a charged reached 120 t, the tap hole 18 was opened to discharge 27 t of the molten iron, and 54 t of the molten iron remained in the furnace.

The estimated height of the metal level before tapping was 440 mm from the furnace bottom 11 but was reduced up to 300 mm after the discharge.

The following was found from the above result. By using the electric furnace 1 including the shallow bottom portion 11a and the reducing material feeding nozzle 33, although the slag was poured within a short period of time of 5 minutes, the reduction reforming can be performed using the molten slag 4 and the solidified slag lump 4a while reducing foaming.

Example 3

Next, an operation was performed under the same conditions as those of Example 1 as shown in FIG. 9 by using the electric furnace 1a shown in FIG. 6 as a reduction reformer.

Specific procedures are as follows.

First, as the electric furnace 1a, a closed tilting type direct current electric furnace having a furnace inner diameter of 6 m was used, in which the openable slag pouring door 14a for charging the molten slag 4 and the solidified slag lump 4a was provided at a part of a water-cooling furnace cover.

In the electric furnace 1a, the shallow bottom portion 11a formed of refractory and having a height of 450 mm from the furnace bottom deepest point was provided immediately below the slag pouring port 14.

The shallow bottom portion 11a was a block formed of refractory having a shape in which one end was in contact with the furnace wall 12 and the inside of the furnace was rectangular.

The area ratio of the shallow bottom portion 11a to the furnace bottom 11 in a plan view was 10%.

In addition, not only the slag pouring port 14 but also the duct 32 for exhausting exhaust gas were provided at the furnace cover 13, and the duct 32 was connected to a combustible gas cooling dust collector.

The furnace bottom tap hole 18a is a tap hole for eccentric bottom tapping (EBT).

That is, the furnace bottom tap hole 18a is a bottom hole of an electric furnace projected portion immersed in molten iron during the tilting of the electric furnace. After tilting, a cover at the bottom of the hole is opened to start tapping.

Once the outflowing of the slag is started after the metal discharge, the hole is rapidly closed using a stopper.

Next, an openable cover provided at the bottom of the hole was closed, and the furnace bottom tap hole 18a was filled with filling sand.

On the other hand, the slag hole 17 is opposite to the furnace bottom tap hole 18a and includes a slag door (not shown) that secures sealability.

During slag discharge, the slag door is opened and the electric furnace la is tilted such that the molten slag 4 is discharged from the opening portion.

A lower end of the tap hole 18 was set at a height of 250 mm from the furnace bottom level, and a lower end of the slag hole 17 was set at a height of 500 mm from the furnace bottom.

Residues remaining in the furnace at this time (before the pouring of the slag) include 54 t of molten iron containing 2.6% of [C] and 25 t of molten slag reduced until (T.Fe) was 1%.

Next, the slag pouring door 14a of the furnace cover 13 was opened, and 20 t of the molten slag 4 transported from the converter was poured into the electric furnace 1a.

Pouring conditions and the slag composition were the same as those of Example 1.

The level of the slag level in the furnace positioned at a height of 630 mm from the furnace bottom deepest point before the pouring of the molten slag 4 increased up to a level of higher than 1200 mm during the pouring. Boiling caused by mixing between the molten slag 4 and the molten iron layer 6 did not occur, and the pouring was able to be stably completed.

After the start of the pouring of the molten slag 4, the addition of the coke breeze, the charge of the solidified slag lump 4a, and the supply of the silica sand were performed through the reducing material feeding nozzle 33 of the furnace cover 13 under the same conditions as those of Example 1.

After 60 minutes from the start of the pouring of the molten slag including a sedation time of 10 minutes from the completion of the pouring of the coke breeze, (T.Fe) in the slag was able to be reduced to be 1% or lower.

In a case where the total amount of the molten slag 4 and the solidified slag lump 4a charged reached 120 t, the furnace bottom tap hole 18a was opened to discharge 27 t of the molten iron, and 54 t of the molten iron remained in the furnace.

The estimated height of the metal level before tapping was 450 mm from the furnace bottom 11 but was reduced up to 300 mm after the discharge.

The following was found from the above result. By using the electric furnace 1a including the shallow bottom portion 11a, even in a case where the tilting furnace was used, slag foaming does not occur, and the reduction reforming can be performed using the molten slag 4 and the solidified slag lump 4a.

INDUSTRIAL APPLICABILITY

According to the present invention, it is possible to provide an electric furnace in which the reduction treatment efficiency can be improved by maintaining an internal atmosphere of the electric furnace to be constant and preventing the occurrence of large slag foaming caused when just-poured molten slag or a solidified slag lump is vigorously mixed with a molten iron layer in the electric furnace.

BRIEF DESCRIPTION OF THE REFERENCE SYMBOLS

1: ELECTRIC FURNACE
1a: ELECTRIC FURNACE
4: MOLTEN SLAG
4a: SOLIDIFIED SLAG LUMP
5: MOLTEN SLAG LAYER
6: MOLTEN IRON LAYER
11: FURNACE BOTTOM
11a: SHALLOW BOTTOM PORTION
11d: DEEP BOTTOM PORTION
12: FURNACE WALL
13: FURNACE COVER
14: SLAG POURING PORT
14a: SLAG POURING DOOR
15: UPPER ELECTRODE
16: FURNACE BOTTOM ELECTRODE
17: SLAG HOLE
18: TAP HOLE
18a: TAP HOLE
21: SLAG TRANSPORT CONTAINER
23: TILTING TROUGH
32: DUCT
33: REDUCING MATERIAL FEEDING NOZZLE

What is claimed is:

1. An electric furnace comprising:
   a cylindrical furnace wall;
   a furnace cover that is provided at an upper end of the furnace wall; and
   a furnace bottom that is provided at a lower end of the furnace wall and includes a deep bottom portion and a shallow bottom portion as a region having a height of 150 mm to 500 mm from a deepest point of the deep bottom portion,
   wherein a slag pouting port into which molten slag or a solidified slag lump is capable of being poured from a slag transport container directly or through a tilting trough is provided,
   the slag pouring port overlaps the shallow bottom portion in a plan view, and
   an area ratio of the shallow bottom portion to the furnace bottom in a plan view is 5% to 40% and further comprising:
   a tilting portion that is configured to tilt the electric furnace;
   a slag hole that is provided at a position of the furnace wall higher than a maximum height of the shallow bottom portion and through which molten slag is discharged; and
   a furnace bottom tap hole that is a bottom hole of an electric furnace projected portion immersed in molten iron during the tilting of the electric furnace and that is provided at a position confronting and aligned with the slag hole on an extended position of the deep bottom portion and through which the molten iron is discharged by tilting.

2. The electric furnace according to claim 1, further comprising:
   a reducing material feeding nozzle that is provided at the furnace cover or at both the furnace cover and the furnace wall and through which a reducing material is added into the electric furnace; and
   an exhaust duct that is provided at the furnace cover.

3. The electric furnace according to claim 1,
wherein the slag pouring port is provided at the furnace cover and is covered with an openable slag pouring door.

4. The electric furnace according to claim 1, wherein the furnace cover is movable between a first state and a second state, in the first state where the furnace cover is positioned at the upper end of the furnace wall, the inside of the electric furnace is closed, and in the second state where the furnace cover is positioned at a lateral side, the slag pouring port is exposed.

5. The electric furnace according to claim 2, wherein the furnace cover is movable between a first state and a second state, in the first state where the furnace cover is positioned at the upper end of the furnace wall, the inside of the electric furnace is closed, and in the second state where the furnace cover is positioned at a lateral side, the slag pouring port is exposed.

6. The electric furnace according to claim 3, wherein the furnace cover is movable between a first state and a second state, in the first state where the furnace cover is positioned at the upper end of the furnace wall, the inside of the electric furnace is closed, and in the second state where the furnace cover is positioned at a lateral side, the slag pouring port is exposed.

* * * * *